United States Patent
Guetter et al.

(10) Patent No.: US 8,805,045 B2
(45) Date of Patent: Aug. 12, 2014

(54) INTERACTION METHOD FOR REGIONS OF-INTEREST IN TIME SERIES IMAGES

(75) Inventors: Christoph Guetter, Lawrenceville, NJ (US); Jens Gühring, Erlangen (DE); Marie-Pierre Jolly, Hillsborough, NJ (US); Arne Littmann, Erlangen (DE); Manuela Rick, Buckenhof (DE); Michaela Schmidt, Uttenreuth (DE); Hui Xue, Franklin Park, NJ (US)

(73) Assignee: Siemens Aktiengesellschaft, Munich (DE)

( * ) Notice: Subject to any disclaimer, the term of this patent is extended or adjusted under 35 U.S.C. 154(b) by 263 days.

(21) Appl. No.: 13/248,309

(22) Filed: Sep. 29, 2011

(65) Prior Publication Data

US 2012/0087561 A1 Apr. 12, 2012

Related U.S. Application Data

(60) Provisional application No. 61/392,076, filed on Oct. 12, 2010.

(51) Int. Cl.
*G06K 9/00* (2006.01)
*G06T 7/00* (2006.01)

(52) U.S. Cl.
CPC ..... *G06T 7/0083* (2013.01); *G06T 2207/30004* (2013.01); *G06T 2207/10116* (2013.01); *G06T 2207/10072* (2013.01); *G06T 2207/10016* (2013.01); *G06T 7/0097* (2013.01); *G06T 2207/20104* (2013.01)
USPC ............................ 382/131; 382/128; 382/130

(58) Field of Classification Search
USPC .......................................... 382/131, 128, 130
See application file for complete search history.

(56) References Cited

U.S. PATENT DOCUMENTS

2008/0100612 A1* 5/2008 Dastmalchi et al. .......... 345/418
2011/0280461 A1* 11/2011 Bystrov et al. ................ 382/131

OTHER PUBLICATIONS

Hautvast et al. "Automatic Contour Propagation in Cine Cardiac Magnetic Resonance Images." IEEE, 2006, pp. 1472-1482.*
Feng et al. "A dual propagation contours technique for semi-automated assessment of systolic and diastolic cardiac function by CMR", J Cardiovasc Magn Reson. Aug. 13, 2009, pp. 1-13.*

* cited by examiner

*Primary Examiner* — Matthew Bella
*Assistant Examiner* — Weiwen Yang

(57) ABSTRACT

A method for identifying a region of interest within a time sequence of images includes acquiring a time sequence of images comprising a plurality of image frames. Image segmentation is performed to segment a region of interest (ROI) from within each of the plurality of image frames of the time sequence of images. Manual edits are received for the ROI within one or more of the plurality of image frames. The manual edits are propagated to other image frames of the plurality of images. An extent to which each of the manual edits are propagated to other image frames is dependent upon a transformation function or deformation field used to propagate the manual edits and a weighing factor that is influenced by a distance in time between the other image frames and the frames that have been manually edited.

26 Claims, 5 Drawing Sheets

INTERACTION METHOD FOR REGIONS OF-INTEREST IN TIME SERIES IMAGES

CROSS-REFERENCE TO RELATED APPLICATION

The present application is based on provisional application Ser. No. 61/392,076, filed Oct. 12, 2010, the entire contents of which are herein incorporated by reference.

BACKGROUND OF THE INVENTION

1. Technical Field

The present disclosure relates to time series images and, more specifically, to an interaction method for regions-of-interest in time series images.

2. Discussion of Related Art

Medical images may be either two-dimensional or three-dimensional and may be comprised of a series of image frames that together show a progression over time. After acquisition, medical images may be segmented such that the bounds of various anatomical structures are correctly identified. Segmentation may be fully manual, fully automatic, or partially automatic.

In manual segmentation, a human user is responsible for delineating the bounds of the anatomical structure. In automatic segmentation, a computer is used to delineate the bounds of the anatomical structure without human intervention. However, most commonly, the user provides some basic identification of the anatomical structure and computer vision techniques are used to work out many of the details involved with discovering the full bounds of the anatomical structure.

Many approaches to semi-automatic segmentation provide a user an opportunity to modify a computer-derived segmentation so that errors may be corrected or ask the user for input that initializes the automatic segmentation procedure. However, where the medical images being segmented are comprised of a series of image frames acquired over a span of time, it may be time consuming and tedious for the user to manually modify each image frame. Some approaches therefore use user modifications as a basis for re-executing the segmentation algorithm. However, such approaches may be computationally expensive and, where multiple image frames have been manually modified, re-executing the segmentation algorithm based on one manually modified frame may overwrite manual modifications made to other image frames.

These concerns may be exacerbated for medical images that are both three-dimensional and include a series over time. Moreover, it is possible that the medical images have a higher dimensionality than three-dimensions, for example, where functional data, flow data, or other characteristics are superimposed over the two or three spatial dimensions of the medical image.

SUMMARY

A method for identifying a region of interest within a time sequence of images includes acquiring a time sequence of images comprising a plurality of image frames. Image segmentation is performed to segment a region of interest (ROI) from within each of the plurality of image frames of the time sequence of images. Manual edits are received for the ROI within one or more of the plurality of image frames. The manual edits are propagated to other image frames of the plurality of images. An extent to which each of the manual edits are propagated to other image frames is dependent upon a transformation function or deformation field used to propagate the manual edits and a weighing factor that is influenced by a distance in time between the other image frames and the frames that have been manually edited.

A method for identifying a region of interest within a time sequence of images includes acquiring a time sequence of images comprising a plurality of image frames. Image segmentation is performed to segment a region of interest (ROI) from within each of the plurality of image frames of the time sequence of images. Manual edits are received to the ROI within one or more of the plurality of image frames. The manual edits are propagated to other image frames of the plurality of images. An extent to which each of the manual edits are propagated to other image frames is dependent upon a distance in time between the other image frames and the frames that have been manually edited.

The extent to which each of the manual edits are propagated to other image frames may be dependent upon a transformation function or deformation field used to propagate the manual edits and a weighing factor that is influenced by the distance in time between the other image frames and the frames that have been manually edited.

Propagating manual edits to the other image frames may include, for each of the other image frames, determining a first transformation based on an effect of manual edits to a nearest left manually edited image frame, determining a second transformation based on an effect of manual edits to a nearest right manually edited image frame, and calculating a new contour for each of the other image frames by combining the first transformation and the second transformation in accordance with a weighing that is proportional to the distance between the other image frame and the nearest left manually edited image frame and the nearest right manually edited image frame.

The time sequence of images may be considered circular such that the first image of the time sequence of images is understood to follow the last image of the time sequence of images and manual edits are propagated past the last image to the first image.

The region of interest may be a contour, one or more landmarks, or a group of pixels. Multiple regions of interest may be identified within the time sequence of images. The time sequence of images may include a sequence of x-rays, magnetic resonance (MR) images, or computed tomography (CT) images. The ROI may delineate a particular anatomical structure, region of disease or injury, or foreign body that is observable within the time sequence of images. Each image frame of the time sequence of images may be a two-dimensional image. Each image frame of the time sequence of images may be a three-dimensional image. Image segmentation may be automatically performed using a computer algorithm. The manual edits may be provided by a human user and include manual adjustments to the ROI to more accurately represent a particular structure. Propagation of the manual edits to the other image frames may include modifying the ROI of one or more of the image frames that have not been manually edited in a manner similar to the manner of the manual edits. The extent to which each of the manual edits are propagated to other image frames may be inversely proportional to the distance in time between the other image frames and the frames that have been manually edited.

A method for identifying a region of interest within a time sequence of images includes acquiring a time sequence of images comprising a plurality of image frames. Image segmentation is performed to segment a region of interest (ROI) from within each of the plurality of image frames of the time sequence of images. Manual edits are received for the ROI within a first edited image frame of the plurality of image frames. Manual edits are received for the ROI within a second edited image frame of the plurality of image frames. The manual edits to the ROI within the first edited image frame are propagated to image frames of the plurality of images preceding the first edited image frame and to image frames between the first edited image frame and the second edited image frame, to an extent that is dependent upon a first transformation function used to propagate the manual edits to the ROI within the first edited image and a first weighing factor that is dependent upon a distance between the image frames and the first edited image frame. The manual edits to the ROI within the second edited image frame are propagated to image frames of the plurality of images subsequent to the second edited image frame and to image frames between the first edited image frame and the second edited image frame, to an extent that is dependent upon a second transformation function used to propagate the manual edits to the ROI within the second edited image and a second weighing factor that is dependent upon a distance between the image frames and the second edited image frame.

The first edited image may be a first keyframe and the second edited image may be a second keyframe. The region of interest may be a contour, one or more landmarks, or a group of pixels. Multiple regions of interest may be identified within the time sequence of images. The time sequence of images may include a sequence of x-rays, magnetic resonance (MR) images, or computed tomography (CT) images. The ROI may delineate a particular anatomical structure, region of disease or injury, or foreign body that is observable within the time sequence of images. Each image frame of the time sequence of images may be a two-dimensional image. Each image frame of the time sequence of images may be a three-dimensional image. Image segmentation may be automatically performed using a computer algorithm. The manual edits may be provided by a human user and include manual adjustments to the ROI to more accurately represent a particular structure. Propagation of the manual edits to the other image frames may include modifying the ROI of one or more of the image frames that have not been manually edited in a manner similar to the manner of the manual edits.

A computer system includes a processor and a non-transitory, tangible, program storage medium, readable by the computer system, embodying a program of instructions executable by the processor to perforin method steps for identifying a region of interest within a time sequence of images. The method includes acquiring a time sequence of images comprising a plurality of image frames. Image segmentation is performed to segment a region of interest (ROI) from within each of the plurality of image frames of the time sequence of images. Manual edits to the ROI within one or more of the plurality of image frames are received. The manual edits are propagated to other image frames of the plurality of images using a transformation function or deformation field. An extent to which each of the manual edits are propagated to other image frames is dependent upon the transformation function or deformation field and a weighing factor that is influenced by a distance in time between the other image frames and the frames that have been manually edited. The manual edits from one of the plurality of images are not propagated to other image frames that have been manually edited.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
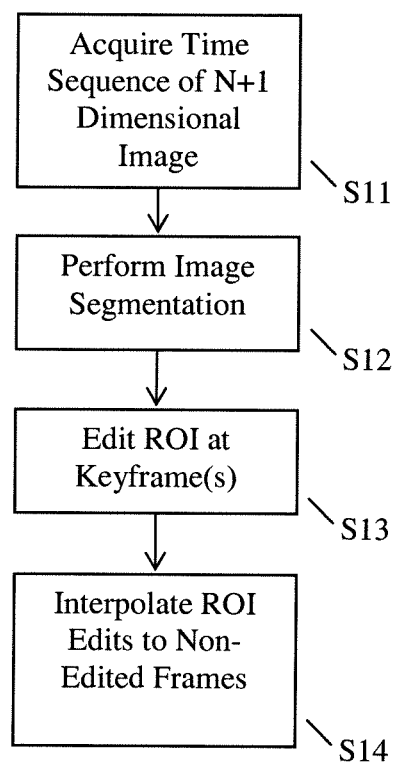
FIG. 1 is a flow chart illustrating a method for propagating user edits of computer-derived segmentation throughout a time series of images according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for propagating user edits of computer-derived segmentation and/or computer-identified landmarks throughout a time series of images. In particular, the time series of images may be two or three dimensional medical images with multiple image frames that span a length of time. For example, the images may be X-ray images, fluoroscopy images, computed tomography (CT) images, magnetic resonance (MR) images, ultrasound images, positron emission tomography (PET) images, or the like.

The computer-derived segmentation may include the identification of a region-of-interest (ROI) which may include the delineation of a particular anatomical structure, a region or tumor of diseased tissue, a foreign body, or any other aspect of the imagery that is of particular concern.

The user edits may include changes made to the delineation of the ROI. Changes may be made, for example, by displaying the acquired imagery on a display device and providing the user with an interface within which the delineation of the ROI may be adjusted, for example, using a mouse and cursor, keyboard commands, and/or a touch-screen interface. The user may have the ability to select which frames of the time series that the user desires to edit. Alternatively, the user may be presented with one or more image frames of particular significance and asked to provide edits to those particular frames. For example, where the image sequence is of the heart, the user may be presented with an end-diastolic image frame and an end-systolic image frame and be asked to perform edits on these frames, such as to correct a computerized delineation of the left ventricle.

As stated above, the image may be two-dimensional; however, where the medical image is three-dimensional, the user may also have the ability to adjust the point of view of the rendering, for example, by rotating the imagery both left-to-right and top-to-bottom. Where the medical image is a time sequence, the user may have the ability to play or step through the sequence either forward or backward with respect to time.

Figure 2:
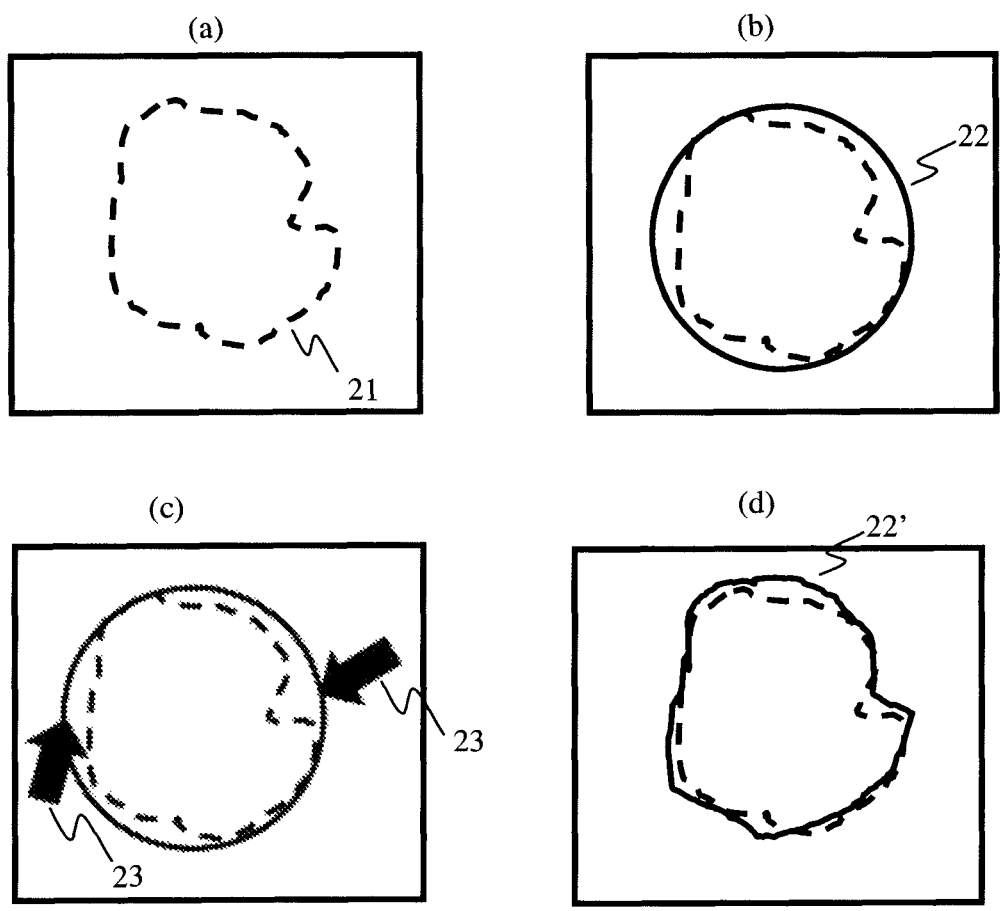
FIG. 2 is a sequence of illustrations showing various stages of computer-derived segmentation according to the method of FIG. 1.

FIG. 1 is a flow chart illustrating a method for propagating user edits of computer-derived segmentation throughout a time series of images according to an exemplary embodiment of the present invention. FIG. 2 is a sequence of illustrations showing various stages of computer-derived segmentation according to the method of FIG. 1.

First, image data may be acquired (Step S11). As discussed above, image data may be medical image data. The image data may be of N-dimensions, where N is a positive integer, and may include a time series of images. The data may therefore be referred to herein as N+1 dimensional image data as it may include N dimensions (1, 2, or 3 of which may be spatial dimensions) and the "+1" dimension representing time. FIG. 2(a) is an illustration representing acquired image data. An anatomical structure 21 may be seen within the illustration.

Segmentation may then be performed on the acquired image data (Step S12). The performance of segmentation may include identification of one or more regions-of-interest ("ROIs") within the image data. The segmentation may be performed across multiple frames of the acquired image, for example, all frames may be segmented. The segmentation may be fully automatic or may involve initial user input, for example, the selection of seed points within at least one image frame. Segmentation may be performed using a known segmentation algorithm or using one or more trained classifiers. FIG. 2(b) is an illustration representing the acquired image data, including the anatomical structure 21, and segmentation results 22. As can be seen, there may be regions in which the segmentation of the ROI deviates from the anatomical structure 21 that it seeks to delineate.

The user may then perform one or more edits to adjust the computer-calculated segmentation (Step S13). Editing of the segmentation results may be performed either at predetermined frames or frames selected by the user. The user may use a cursor or touchscreen to manually adjust the segmentation results to better fit the anatomical structure. FIG. 2(c) illustrates the segmentation results 22 being edited by a user to more closely fit the anatomical structure 21 by placing one or more cursors 23 at portions of the segmentation results 22 that are most in need of editing. Implementation of editing may be assisted by algorithms so that the user does not necessarily need to edit the segmentation results at a pixel-by-pixel level. FIG. 2(d) illustrates the edited segmentation results 22'.

Each image frame that the user edits may become a "keyframe." As the user may edit multiple image frames, there may be multiple keyframes within the sequence of images. Each ROI may be edited one or more times in each keyframe. Where the segmentation includes multiple errors, each error may be corrected by the user with a distinct edit. There may also be multiple ROIs within each image frame, and accordingly, each keyframe may include edits to more than one ROI. Alternatively, some keyframes may include edits to one ROI while other keyframes may include edits to a distinct ROI. In fact, according to one exemplary embodiment of the present invention, a particular image frame may be a keyframe with respect to one ROI but not be a keyframe with respect to another ROI.

Exemplary embodiments of the present invention may then use the edits made to the one or more keyframes to automatically adjust one or more other image frames (Step S14). However, exemplary embodiments of the present invention may refrain from making any automatic adjustments to the keyframes. In this respect, the keyframes may be considered fixed as they may represent the user's knowledge about the ROI.

The extent to which other frames are adjusted based on the edits made to the keyframes may be determined by the distance of those other frames to the keyframes. Thus, the closer in time a given frame is to a keyframe, the greater the influence of the edits on the keyframe are on that given frame. Similarly, the farther in time a given frame is to a keyframe, the lesser the influence of the edits on the keyframe are on that given frame. In this sense, the edits made to the keyframe are propagated to neighboring frames with an influence that is inversely proportional to the distance between each frame and the keyframe; the greater the distance, the lesser the influence.

Accordingly, the shape of a current ROI may be most strongly influenced by the keyframe that is in closest proximity to it. This may guarantee a smooth transition between user edits and geometric relationships of the ROIs resulting in a consistent representation of the ROI in the N+1 dimensions.

Propagation of the edits may occur at a per-pixel level. For example, if a given pixel in a keyframe is moved up and to the right, a corresponding pixel in a proximate image frame may also be moved up and to the right, albeit, not necessarily to the same extent as the corresponding pixel of the keyframe was moved during editing.

Alternatively, propagation of the edits may occur with respect to anatomical structures or other landmarks so that if a given landmark is moved up and to the right, a corresponding landmark in a proximate image frame may also be moved up and to the right, regardless of where that given landmark is found within the image frame. This approach may be particularly useful where the ROI experiences significant motion or otherwise changes shape from frame-to-frame.

Propagation of the edits may occur both forwards and backwards in time. Accordingly, edits made to a keyframe may influence other frames that occur before and after the keyframe. Where multiple keyframes are present in a single image sequence, many image frames may be positioned between two keyframes, one occurring prior to a given image frame and another occurring subsequent to the given image frame. In such an event, the edits of two keyframes may each influence the ROI of the given image frame in accordance with the relative distance between the given image frame and each of the neighboring keyframes.

Accordingly, this interaction concept may define an ROI of a current frame that is located between two keyframes as a weighted interpolation between the corresponding ROI in the keyframe to the left and the keyframe to the right that are geometrically propagated to the current frame.

As stated above, the influence of an edit of a keyframe on a given image frame may diminish as the distance between that keyframe and the given image frame, in time, grows larger. This influence may end at or prior to the next keyframe. Thus, according to exemplary embodiments of the present invention, edits performed with respect to the ROI of one keyframe may not at all influence another keyframe, and while the frames occurring between these two keyframes may be influenced by the edit of both keyframes, to varying degrees, because the influence of one keyframe ends as the next keyframe, image frames beyond that next keyframe may not be influenced at all by the edits of the one key frame.

A function $\Phi$ may be generated to transform edits made in a keyframe to another frame of the image sequence and thereby generate the mapping between the frames to propagate individual locations, for example, pixels, contour points, etc., from frame to frame. This function may therefore represent the geometric (e.g. spatial) relationship between an ROI in a keyframe and the same ROI in another frame. The function $\Phi$ may be generated by a registration of all frames representing the geometrical mapping between the frames. However, exemplary embodiments of the present invention are not limited to this exemplary approach. Generation of the function Φ may be performed in other ways. For example, the function Φ may be generated by functional mapping of single locations generated by a Fast-Fourier Transform. In this way, the function Φ may be a function of landmarks.

The function Φ may represent a deformation field that acts upon the segmentation/landmarks of the unedited frame(s) to propagate the user edits. The deformation fields may signify how the deformation field may be influenced by a weighing factor w such that deformation is more pronounced at image frames closer to the user-edited image frame.

Figure 3:
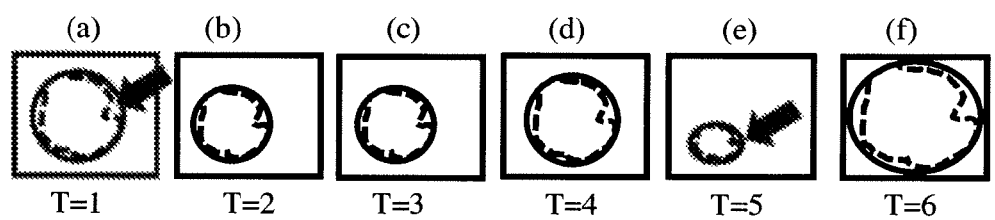
FIG. 3 illustrates a sequence of image frames including keyframes and image frames that are not keyframes and further illustrates the effect of the keyframes on the other frames according to an exemplary embodiment of the present invention.
Figure 3:
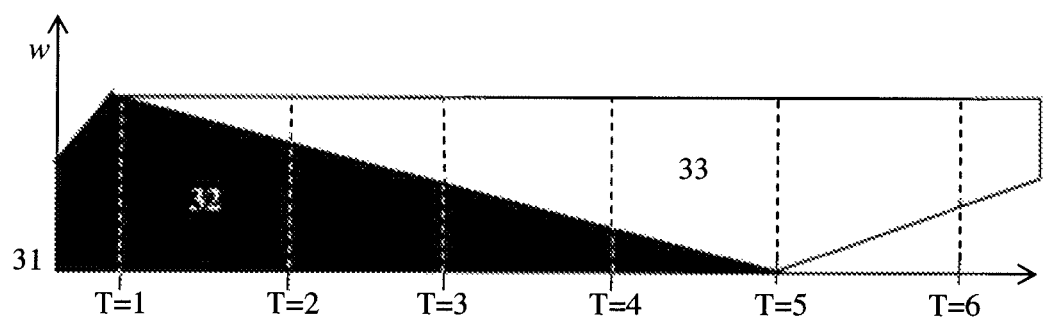

FIG. 3 illustrates a sequence of image frames including keyframes and image frames that are not keyframes and further illustrates the effect of the keyframes on the other frames according to an exemplary embodiment of the present invention.

In FIG. 3, image (a) is a first image frame that is acquired at a time T=1. Image (b) is a second image frame that is acquired at a time T=2. Image (c) is a third image frame that is acquired at a time T=3. Image (d) is a fourth image frame that is acquired at a time T=4. Image (e) is a fifth image frame that is acquired at a time T=5. Image (f) is a sixth image frame that is acquired at a time T=6. Images (a) and (e) are key frames as illustrated by the placement of cursors within these images to represent user edits. Each image includes an anatomical structure and a segmentation result similar to those illustrated in FIG. 2 and shown as 21 and 22, respectively. The size and shape of the anatomical structure changes from frame to frame and the segmentation result is fitted accordingly based on the application of a segmentation algorithm.

While the manner of propagation illustrated in FIG. 3 appears to be a substantially linear interpolation, linear propagation is shown for the purposes of providing a simplified explanation and the invention should not be understood as being limited to a linear propagation. For example, an alternative manner of propagation is described below with respect to FIG. 4.

The edits of the keyframe shown in image (a) are propagated throughout the image sequence. The edits made to image (a) are to a lesser extent applied forward and backward through time (although no image frames prior to image (a) are shown). The influence of the edits of image (a) fall off as the time approaches T=5, and becomes zero at time T=5, which is the point of the next keyframe. However, while the degree of influence the edits have on the surrounding image frames may be related to the distance between the user-edited frames and the surrounding frames, the degree of influence need not be linearly dependent upon this distance. Rather, the degree of influence may be determined by the particular deformation fields and the weighing factor w that is proportional to the linear distance between the user-edited frames and the surrounding frames.

Similarly, the edits of the keyframe shown in image (e) are propagated throughout the image sequence. Influence of the keyframe is maximum at time T=5 and then dissipates in both directions as frames get farther away. The effect of the keyframe (e) goes to zero at time T=1, which is the point of the other keyframe (a). Moreover, the time series may be defined as circular, in which case the first image frame at time T=1 is understood to follow the last image frame, here, at time T=5. Thus, if there is only one keyframe, that single keyframe may be considered both the left and right keyframe with respect to the non-keyframe image frames.

Graph 31 of FIG. 3 illustrates the combined influence of the edits of each keyframe on the various image frames of the image sequence. The black section marked 32 illustrates the impact of the edits of keyframe (a) and the white section marked 33 illustrates the impact of the edits of keyframe (e).

As can be seen from this graph, the image frames between the two keyframes are affected by each keyframe to a varying degree that is dependent upon the relative distances between the given image frame and the neighboring keyframes. While this degree of dependence may appear to be linear in the provided figure, it should be understood that dependence is not necessarily linear, but rather, may be defined by the nature of the deformation field and the linear weighing w.

Exemplary embodiments of the present invention may be broadly applied to various purposes. For example, the ROIs may represent contours of the heart in 2D, areas of flow in 2D, surfaces of various organs in 3D, and so on, that may be created by an automated process. The ROIs may further represent anatomical points of interest such as landmarks or contours in either 2D or 3D.

Moreover, exemplary embodiments of the present invention may provide an approach by which only a subset of the image frames, for example, two or three frames, are viewed by the user. For example, the user may, upon examining the full set of image frames, choose to more closely analyze a particular subset of images that the user may select. Alternatively, the user may be presented with an automatically selected or predetermined subset of images that may be interpreted as illustrating a key feature of the full set of image frames. In either event, the user may be provided with the opportunity to edit one or more frames of the subset.

After editing one or more keyframes of the subset, the edits may either be propagated throughout the entire subset or it may be assumed that in light of the user's opportunity to individually inspect and edit each frame of the subset, all frames of the subset, whether edited or not, may be treated as keyframes.

The user may then choose to revert the subset of images back into the full set of image frames. Upon reversion, exemplary embodiments of the present invention may propagate, forward and backward with respect to time, the edits made to the keyframes of the subset, for example, as described above, throughout those image frames of the full set of image frames that were not included in the subset.

Exemplary embodiments of the present invention may provide for a diffeomorphic relationship between the user-edited ROIs and the ROIs of related image frames in which the user edits have been propagated to. In this way, the morphology of the ROIs, for example, contours, may remain unchanged. Accordingly, propagation of the user edits would not introduce any folding or overlapping of contours onto themselves and each other.

Figure 4:
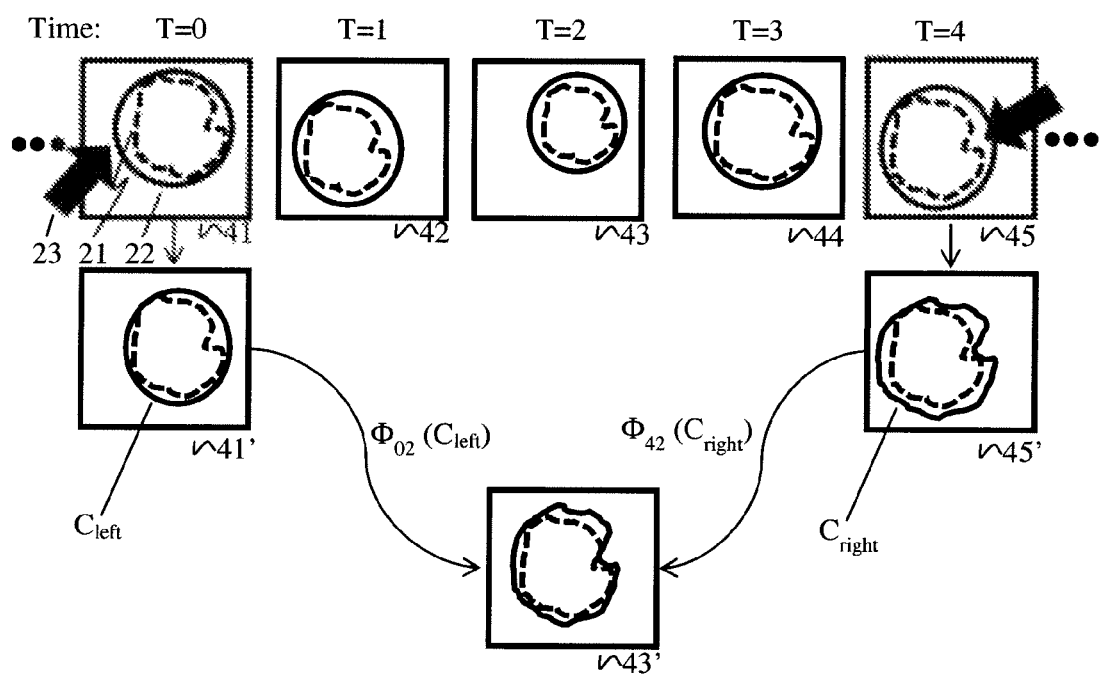
FIG. 4 illustrates the effect of the keyframes on the other frames according to an exemplary embodiment of the present invention.

FIG. 4 illustrates the effect of the keyframes on the other frames according to an exemplary embodiment of the present invention. Frames 41-45 depict five consecutive frames of an image sequence. Ellipses are used to signify that these five frames do not necessarily include the first or last image frame of the sequence. Each frame illustrates a particular image frame representing a point in time from time T=0 to time T=4. In each frame, there is an anatomical structure 21 and a segmentation result 22. Frames 41 and 45 are keyframes and include user edits represented by cursors 23. Frame 41' illustrates the effects of the user edits on the segmentation result 22 for frame 41. Frame 45' illustrates the effects of the user edits on the segmentation result 22 for frame 45.

Frames 42-44 are not keyframes and accordingly, the edits of the keyframes 41 and 45 may be propagated to each of the non-keyframes 42-44 representing phases 1-3. In so doing, the segmentation result 22 for each of the non-keyframes 42-44 may be modified based on the influence of the nearest left keyframe and the nearest right keyframe. Because the non-keyframes 42-44 occur between keyframes 41 and 45, the edits to keyframe 41 contour (show in 41') may be considered the nearest left keyframe contour ($C_{left}$) and the edits to keyframe 45 contour (shown in 45') may be considered the nearest right keyframe contour ($C_{right}$).

For the purposes of providing a simple and concise explanation, the manner of propagating the user edits of the keyframes to the non-keyframes will be described herein with respect to frame 43 at time T=2, however, it is to be understood that the effects of the user edits on the other non-keyframes may be similarly calculated. In calculating the effects of the user edits on frame 43 (to arrive at frame 43'), two component effects may first be calculated. The first component effect is the effect on the frame by the nearest left keyframe ($C_{left}$). This component effect may be referred to herein as $\Phi_{02}$ ($C_{left}$) as it represents the transformation from the edits to the frame at time T=0 on the frame at time T=2. The second component effect is the effect on the frame by the nearest right keyframe ($f_{right}$). This component effect may be referred to herein as $\Phi_{42}$ ($C_{right}$) as it represents the transformation from the edits to the frame at time T=4 on the frame at time T=2. The component effect of $C_{right}$ may also be represented as $\Phi^{-1}_{24}$, as $\Phi_{42}$ is equivalent to the inverse of $\Phi_{24}$, which is $\Phi^{-1}_{24}$.

The new contour for the frame at time T=2 (illustrated in 43') $C_{new}$, may be an interpolation between $\Phi_{02}$ ($C_{left}$) and $\Phi_{42}$ ($C_{right}$). A weighing factor w may be used to weigh the effects of $C_{left}$ and $C_{right}$ in accordance with a linear distance between the image frame being calculated (here, at time T=2) and the nearest left and right keyframes. For example, $C_{new}$ may be calculated as follows:

$$C_{new}=w\Phi_{02}(C_{left})+(1-w)\Phi_{42}(C_{right})$$

However, in calculating $C_{new}$, rather than simply adding the weighted effects of the $C_{left}$ transformation with the weighted effects of the $C_{right}$ transformation, as shown, exemplary embodiments of the present invention may use a more sophisticated interpolation method. For example, the contour interpolation method may return the centerline that lies right in between both left and right contours ($C_{left}$ and $C_{right}$) where the weight w then "moves" this centerline towards one of the two contours depending on its value. Where the contours are landmarks, the given formula may apply since an "interpolation" between two landmarks can be defined by a straight line. However, where the contours are more generally defined, other interpolation methods may be used.

Figure 5:
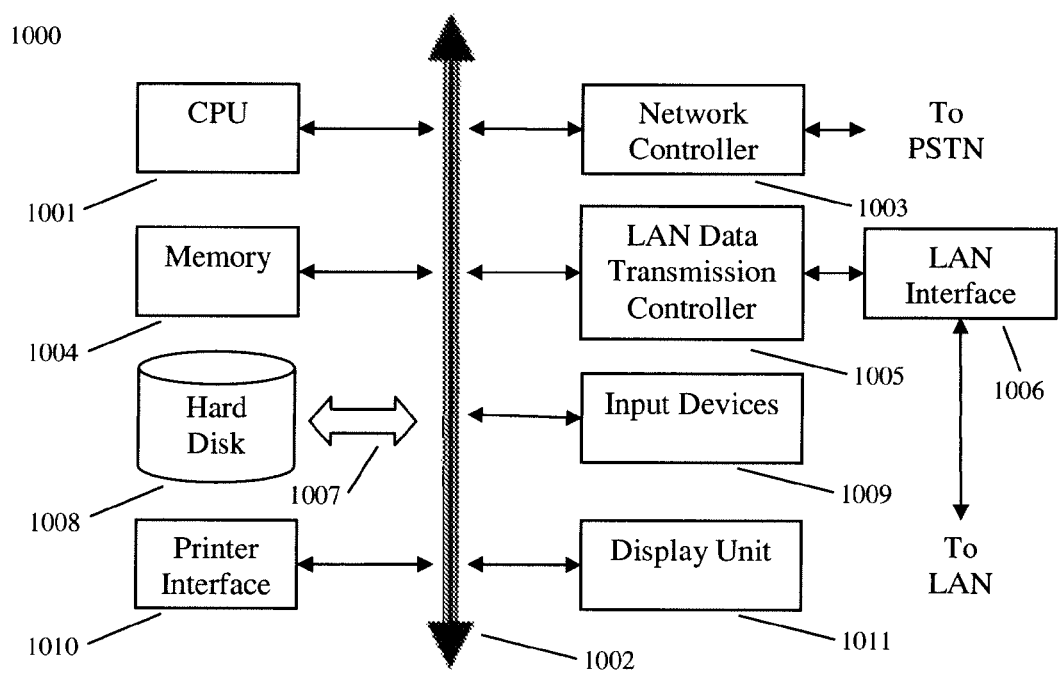
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for identifying a region of interest within a time sequence of images, comprising:

acquiring a time sequence of images comprising a plurality of image frames;

performing image segmentation to segment a first region of interest (ROI) and a second ROI from within each of the plurality of image frames of the time sequence of images;

receiving one or more manual edits to the first ROI within a first keyframe for the first ROI of the plurality of image frames;

receiving one or more manual edits to the ROI within a second keyframe for the first ROI of the plurality of image frames;

receiving one or more manual edits to the second ROI within a first keyframe for the second ROI of the plurality of image frames;

receiving one or more manual edits to the second ROI within a second keyframe for the second ROI of the plurality of image frames;

propagating the manual edits corresponding to the first ROI to other image frames of the plurality of images, the other image frames being those image frames of the plurality of image frames that are neither the first keyframe for the first ROI nor the second keyframe for the first ROI; and propagating the manual edits corresponding to the second ROI to other image frames of the plurality of images, the other image frames being those image frames of the plurality of image frames that are neither the first keyframe for the second ROI nor the second keyframe for the first ROI, wherein an extent to which each of the manual edits for the first and second ROI are propagated to other image frames is dependent upon a distance in time between each of the other image frames and the first and second keyframes that have been manually edited for the first ROI, respectively, and wherein the first keyframe for the first ROI, the second keyframe for the first ROI, the first keyframe for the second ROI, and the second keyframe for the second ROI are all different frames of the plurality of image frames.

2. The method of claim 1, wherein the extent to which each of the manual edits are propagated to other image frames is dependent upon a transformation function or deformation field used to propagate the manual edits and a weighing factor that is influenced by the distance in time between the other image frames and the first or second keyframes that have been manually edited.

3. The method of claim 1, wherein propagating manual edits to the other image frames includes, for each of the other image frames, determining a first transformation based on an effect of manual edits to a frame of the plurality of image frames nearest to the left of a manually edited keyframe of the first and second keyframes, determining a second transformation based on an effect of manual edits to a frame of the plurality of image frames nearest to the right of the manually edited keyframe of the first and second keyframes, and calculating a new contour for each of the other image frames by combining the first transformation and the second transformation in accordance with a weighing that is proportional to the distance between the other image frame and the nearest left manually edited keyframe of the first and second keyframes and the nearest right manually edited keyframe of the first and second keyframes.

4. The method of claim 1, wherein the time sequence of images is considered circular such that the first image of the time sequence of images is understood to follow the last image of the time sequence of images and manual edits are propagated past the last image to the first image.

5. The method of claim 1, wherein the region of interest is a contour, one or more landmarks, or a group of pixels.

6. The method of claim 1, wherein multiple regions of interest are identified within the time sequence of images.

7. The method of claim 1, wherein the time sequence of images includes a sequence of x-rays, magnetic resonance (MR) images, or computed tomography (CT) images.

8. The method of claim 1, wherein the ROI delineates a particular anatomical structure, region of disease or injury, or foreign body that is observable within the time sequence of images.

9. The method of claim 1, wherein each image frame of the time sequence of images is a two-dimensional image.

10. The method of claim 1, wherein each image frame of the time sequence of images is a three-dimensional image.

11. The method of claim 1, wherein image segmentation is automatically performed using a computer algorithm.

12. The method of claim 1, wherein the manual edits are provided by a human user and include manual adjustments to the ROI to more accurately represent a particular structure.

13. The method of claim 1, wherein propagation of the manual edits to the other image frames includes modifying the ROI of one or more of the image frames that have not been manually edited in a manner similar to the manner of the manual edits.

14. The method of claim 1, wherein the extent to which each of the manual edits are propagated to other image frames is inversely proportional to the distance in time between the other image frames and the keyframe that have been manually edited.

15. A method for identifying a region of interest within a time sequence of images, comprising:
  acquiring a time sequence of images comprising a plurality of image frames;
  performing image segmentation to segment a first region of interest (ROI) and a second ROI from within each of the plurality of image frames of the time sequence of images;
  receiving manual edits to the first ROI within a first edited image frame for the first ROI of the plurality of image frames;
  receiving manual edits to the first ROI within a second edited image frame for the first ROI of the plurality of image frames;
  receiving manual edits to the second ROI within a first edited image frame for the first ROI of the plurality of image frames;
  receiving manual edits to the second ROI within a second edited image frame for the first ROI of the plurality of image frames;
  propagating the manual edits to the first ROI within the first edited image frame for the first ROI to image frames of the plurality of images preceding the first edited image frame for the first ROI and to image frames between the first edited image frame for the first ROI and the second edited image frame for the first ROI, to an extent that is dependent upon a first transformation function used to propagate the manual edits to the first ROI within the first edited image and a first weighing factor that is dependent upon a distance between the image frames and the first edited image frame for the first ROI;
  propagating the manual edits to the first ROI within the second edited image frame for the first ROI to image frames of the plurality of images subsequent to the second edited image frame for the first ROI and to image frames between the first edited image frame for the first ROI and the second edited image frame for the first ROI, to an extent that is dependent upon a second transformation function used to propagate the manual edits to the first ROI within the second edited image for the first ROI and a second weighing factor that is dependent upon a distance between the image frames and the second edited image frame for the first ROI;
  propagating the manual edits to the second ROI within the first edited image frame for the second ROI to image frames of the plurality of images preceding the first edited image frame for the second ROI and to image frames between the first edited image frame for the second ROI and the second edited image frame for the second ROI, to an extent that is dependent upon a third transformation function used to propagate the manual edits to the second ROI within the first edited image and a first weighing factor that is dependent upon a distance between the image frames and the first edited image frame for the second ROI; and
  propagating the manual edits to the second ROI within the second edited image frame for the second ROI to image frames of the plurality of images subsequent to the second edited image frame for the second ROI and to image frames between the first edited image frame for the second ROI and the second edited image frame for the second ROI, to an extent that is dependent upon a fourth transformation function used to propagate the manual edits to the first ROI within the second edited image for the second ROI and a second weighing factor that is dependent upon a distance between the image frames and the second edited image frame for the second ROI,
  wherein the image frames between the first and second edited image frames for the first ROI transition from being fully influenced by the manual edits of the first edited image frame for the first ROI and not at all influenced by the manual edits of the second edited image frame to being fully influenced by the manual edits of the second edited image frame for the first ROI and not at all influenced by the manual edits of the first edited image frame for the first ROI, and
  wherein the image frames between the first and second edited image frames for the second ROI transition from being fully influenced by the manual edits of the first edited image frame for the second ROI and not at all influenced by the manual edits of the second edited image frame to being fully influenced by the manual edits of the second edited image frame for the second ROI and not at all influenced by the manual edits of the first edited image frame for the second ROI.

16. The method of claim 15, wherein the first edited image is a first keyframe and the second edited image is a second keyframe.

17. The method of claim 15, wherein region of interest is a contour, one or more landmarks, or a group of pixels.

18. The method of claim 15, wherein multiple regions of interest are identified within the time sequence of images.

19. The method of claim 15, wherein the time sequence of images includes a sequence of x-rays, magnetic resonance (MR) images, or computed tomography (CT) images.

20. The method of claim 15, wherein the ROI delineates a particular anatomical structure, region of disease or injury, or foreign body that is observable within the time sequence of images.

21. The method of claim 15, wherein each image frame of the time sequence of images is a two-dimensional image.

22. The method of claim 15, wherein each image frame of the time sequence of images is a three-dimensional image.

23. The method of claim 15, wherein image segmentation is automatically performed using a computer algorithm.

24. The method of claim 15, wherein the manual edits are provided by a human user and include manual adjustments to the ROI to more accurately represent a particular structure.

25. The method of claim 15, wherein propagation of the manual edits to the other image frames includes modifying the ROI of one or more of the image frames that have not been manually edited in a manner similar to the manner of the manual edits.

26. A computer system comprising:
a processor; and
a non-transitory, tangible, program storage medium, readable by the computer system, embodying a program of instructions executable by the processor to perform method steps for identifying a region of interest within a time sequence of images, the method comprising:
acquiring a time sequence of images comprising a plurality of image frames;
performing image segmentation to segment a first region of interest (ROI) and a second ROI from within each of the plurality of image frames of the time sequence of images;
receiving one or more manual edits to the first ROI within a first keyframe for the first ROI of the plurality of image frames;
receiving one or more manual edits to the ROI within a second keyframe for the first ROI of the plurality of image frames;
receiving one or more manual edits to the second ROI within a first keyframe for the second ROI of the plurality of image frames;
receiving one or more manual edits to the second ROI within a second keyframe for the second ROI of the plurality of image frames;
propagating the manual edits corresponding to the first ROI to other image frames of the plurality of images, the other image frames being those image frames of the plurality of image frames that are neither the first keyframe for the first ROI nor the second keyframe for the first ROI; and
propagating the manual edits corresponding to the second ROI to other image frames of the plurality of images, the other image frames being those image frames of the plurality of image frames that are neither the first keyframe for the second ROI nor the second keyframe for the first ROI,
wherein an extent to which each of the manual edits for the first and second ROI are propagated to other image frames is dependent upon a distance in time between each of the other image frames and the first and second keyframes that have been manually edited for the first ROI, respectively, and
wherein the first keyframe for the first ROI, the second keyframe for the first ROI, the first keyframe for the second ROI, and the second keyframe for the second ROI are all different frames of the plurality of image frames.

* * * * *